United States Patent [19]
Hashizume et al.

[11] Patent Number: 5,232,093
[45] Date of Patent: Aug. 3, 1993

[54] TAPE CASSETTE HOUSING

[75] Inventors: Kenji Hashizume, Nagano; Masatoshi Okamura, Saku; Haruo Shiba, Komoro; Motohiko Shima, Saku, all of Japan

[73] Assignee: TDK Corporation, Tokyo, Japan

[21] Appl. No.: 839,489

[22] Filed: Feb. 20, 1992

[30] Foreign Application Priority Data

Feb. 22, 1991 [JP] Japan .................. 3-14538
Feb. 26, 1991 [JP] Japan .................. 3-16118

[51] Int. Cl.⁵ ........................... B65D 85/672
[52] U.S. Cl. ........................................ 206/387
[58] Field of Search ............................ 206/387

[56] References Cited

U.S. PATENT DOCUMENTS

| | | |
|---|---|---|
| 2,991,958 | 7/1961 | Eifrid . |
| 3,541,052 | 11/1970 | Kirk . |
| 3,587,840 | 6/1971 | Hultberg . |
| 3,861,560 | 1/1975 | Entwistle et al. . |
| 3,958,768 | 5/1976 | Fairbanks .............. 206/391 X |
| 4,006,854 | 2/1977 | Gibson et al. .......... 206/409 X |
| 4,108,305 | 8/1978 | Komatu .................. 206/330 |
| 4,165,807 | 8/1979 | Yagi ...................... 206/409 |
| 4,231,474 | 11/1980 | Takahashi ................ 206/387 |
| 4,235,334 | 11/1980 | Ahn ....................... 206/387 |
| 4,245,740 | 1/1981 | Thiele ..................... 206/387 |
| 4,365,711 | 12/1982 | Long et al. .............. 206/387 |
| 4,428,481 | 1/1984 | Basili ..................... 206/387 |

FOREIGN PATENT DOCUMENTS

| | | | |
|---|---|---|---|
| 3335558 | 4/1985 | Fed. Rep. of Germany ...... 206/387 |
| 2022555A | 12/1979 | United Kingdom . |
| 2179328 | 3/1987 | United Kingdom .............. 206/387 |

Primary Examiner—William I. Price
Attorney, Agent, or Firm—Price, Gess & Ubell

[57] ABSTRACT

A tape cassette housing capable of ensuring safety of a tape cassette in non-use of the tape cassette or during storage and transportation of the tape cassette. The tape cassette housing includes a housing body, a cover, a hinge for relatively openably connecting the housing body and cover to each other, and one or two pairs of projections provided on an inner surface of one of the housing body or cover. The projections are arranged in a manner to positionally correspond to pressing members of a tape cassette for holding reels of the tape cassette through the pressing members when the tape cassette housing is closed while receiving the tape cassette therein, to securely hold the pressing members, resulting in rendering the reels immovable in the tape cassette without any clattering. The housing may be provided with a locking mechanism for locking the housing body and cover together when the tape cassette housing is closed, to thereby further enhance safety of the tape cassette.

21 Claims, 13 Drawing Sheets

TAPE CASSETTE HOUSING

BACKGROUND OF THE INVENTION

1. Field of the Invention invention relates to a housing for a tape cassette (hereinafter referred to as a tape cassette housing) which is adapted to receive a tape cassette therein in non-use of the tape cassette, and more particularly to a tape cassette housing for receiving therein a tape cassette, particularly, a tape cassette for business or commercial use such as a video tape cassette or the like for, storage, transportation or the like.

2. Description of Related Art

A video tape cassette which has been conventionally used for a business or commercial purpose such as broadcasting or the like is generally constructed as shown in FIGS. 1 and 2. More particularly, the conventional video tape cassette generally designated at reference numeral 100 in FIG. 1 includes a cassette casing 102 comprising an upper casing member 104, a lower casing member 106 and a front lid or cover 108 for selectively closing a front opening of the casing 102 defined between the upper casing member 104 and the lower casing member 106. In the casing 100 are rotatably received a feed reel 110 and a take-up reel 112 on which a magnetic tape (not shown) is wound in a manner to extend therebetween. The upper casing member 104 includes an upper plate 114, which is provided at a central portion thereof with an elongated transparent window 116, and the lower casing member 106 includes a lower or bottom plate 118, which is formed with a pair of holes 117 in which drive shafts of a video tape deck for transmitting drive force therethrough from a drive system of the deck to a hub 120 of the feed reel 110 and a hub 122 of the take-up reel 112 are adapted to be inserted, respectively. The front lid 108 comprises an outer lid section and an inner lid section and is adapted to close the front opening of the casing 102 by elastic force applied thereto and protect a portion of the magnetic tape extending across the front lid in a manner to interpose the portion therebetween in non-use of the video tape cassette. This effectively prevents not only dust from entering the video tape cassette through the front opening but prevents an operator or user from touching the video tape by mistake during storage or transportation of the video tape cassette. Adhesion of dust or the like to the magnetic tape or damage to the magnetic tape causes errors to be produced in a signal stored on the tape, leading to disturbance of an image, drop-out of an image and the like.

Also, the drive shaft inserting holes 117 formed at the lower plate of the lower casing member 106 are adapted to be closed with the corresponding reels 110 and 112, respectively. Unfortunately, the conventional video tape cassette fails to permit the reels to satisfactorily close the inserting holes without aid of any additional means. In view of the above, the conventional video tape cassette is so constructed that pressing members 124 and 126 which each may comprise, for example, a spring-forced button and are adapted to be respectively put on the hubs 120 and 122 to cause the reels 110 and 112 to be pressed against the lower plate 118 of the lower casing member 106 in non-use of the video tape cassette, to thereby ensure closing of the inserting holes 117 with the reels. The so-constructed pressing members 124 and 126 each are provided at an upper end thereof with a flange, which is arranged to outwardly project via a through-hole 128 (130) formed at the transparent window 116.

As will be noted from the foregoing, in use of the video tape cassette, the pressing members 124 and 126, function to initially downward press the reels 110 and 112, and are forced upward by drive shafts to thereby permit the tape to stably travel. FIG. 2 also shows an operational relationship between the feed reel 110 and the pressing member 124, of which a left half shows the relationship in non-use of the video tape cassette and a right half shows it in use of the cassette. As shown in FIG. 2, the pressing member 124 includes a coiled spring 132 and a button 134 constantly upward urged by the coiled spring 132. The feed reel 110 is provided at upper and lower ends thereof with an upper flange 136 and a lower flange 138, respectively. It is a matter of course that the relationship between the take-up reel 112 and the pressing member 126 may be formed in substantially the same manner as that between the reel 110 and the pressing member 124 described above. The video tape cassette constructed as described above is generally stored and transported while being received or housed in a tape cassette housing comprising a housing body and an upper cover and provided with a locking mechanism.

As described above, in non-use of the video tape cassette, the reels 110 and 112 are merely pressed against the bottom plate 118 of the lower casing member 106 by the pressing members 124 and 126, respectively. This renders the reels 110 and 112 unstable in the casing 102 during transportation of the video tape cassette, to thereby cause the reels to collide with an inner surface of the cassette casing 102 and/or any projection on the inner surface, resulting in fragments or dust being produced. This causes any error to be produced in signals stored on the magnetic tape even when the video tape cassette is constructed so as to prevent dust from entering the cassette from the exterior as described above. In the worst case, a head of the video tape deck is clogged with the so-produced fragments or dust. In general, the cassette casing 102 is provided therein with a reel brake for preventing looseness of the magnetic tape. Unfortunately, the reel brake fails to prevent rotation of the reels in a tape recording or playing-back direction although it prevents the rotation in a tape rewinding direction, to thereby fail to prevent generation of the fragments and dust.

A tape cassette housing which has been conventionally used for receiving therein a video tape cassette for business or commercial use such as the above-described video tape cassette in non-use of the tape cassette is generally constructed in such a manner as shown in FIG. 3. More particularly, in the conventional tape cassette housing, a rectangular housing body 140 and a rectangular cover 142 are connected to each other through a hinge member 144 so as to permit the cover 142 to be openable with respect to the housing body 140. Also, the housing body 140 is provided at a surface portion thereof engaged with the cover 142 with a stopper means 146.

Unfortunately, the conventional tape cassette housing constructed as described above causes the cover to be easily released from the engagement with the housing body 140 because the stopper means 146 fails to exhibit frictional resistance and impact or shock resistance to a degree sufficient to securely hold the cover 142 with respect to the housing body 140, resulting in the tape cassette being ejected from the housing. Also, this causes the tape cassette housing to fail to exhibit a dust-proof function. Such a disadvantage is particularly encountered with a video tape cassette for business use because it is heavy. In order to solve the problem, it is proposed to provide the tape cassette housing with increased lock strength. However, this leads to deterioration of operability of the housing and troublesomeness of the handling.

SUMMARY OF THE INVENTION

The present invention has been made in view of the foregoing disadvantages of the prior art.

Accordingly, it is an object of the present invention to provide a tape cassette housing which is capable of preventing production of fragments or dust in a tape cassette.

It is another object of the present invention to provide a tape cassette housing which is capable of preventing chattering or clattering of reels in a cassette casing.

It is a further object of the present invention to provide a tape cassette housing which is capable of ensuring safety of a tape cassette in non-use of the tape cassette.

It is still another object of the present invention to provide a tape cassette housing which is capable of exhibiting a satisfactory locking action.

It is yet another object of the present invention to provide a tape cassette housing which is capable of being simply and easily handled.

It is even another object of the present invention to provide a tape cassette housing which is capable of exhibiting satisfactory rigidity, endurance, dust-proofness and safety.

It is a still further object of the present invention to provide a tape cassette housing which is capable of being manufactured at a reduced cost.

It is a yet further object of the present invention to provide a tape cassette housing which is capable of being significantly simplified in structure.

In accordance with the present invention, a tape cassette housing is provided which is adapted to receive therein a tape cassette which includes a cassette casing having an upper casing member and a lower casing member arranged opposite to each other, a pair of reels arranged in the cassette casing, and a pair of pressing members arranged in the cassette casing for pressing the reels against one of the casing members. The tape cassette housing comprises a first housing member including a first base plate, a second housing member including a second base plate, a hinge member arranged between the first housing member and the second housing member, and at least a pair of projections provided on an inner surface of one of the first and second base plates of the first and second housing members. The first and second housing members are connected to each other through the hinge member in a manner to be relatively openable, to thereby define a space therebetween for receiving the tape cassette when the tape cassette housing is closed. The projections are arranged in a manner to positionally correspond to the pressing members of the tape cassette when the tape cassette housing is closed while receiving the tape cassette therein, to thereby stably hold the tape cassette in the tape cassette housing.

Also, in accordance with the present invention, a tape cassette housing is adapted to receive therein a tape cassette which includes a cassette casing having an upper casing member and a lower casing member arranged opposite to each other, a pair of reels arranged in the cassette casing, a pair of pressing members arranged in the cassette casing for pressing the reels against one of the casing members. The tape cassette housing comprises a first housing member including a first base plate, a second housing member including a second base plate, a hinge member arranged between the first housing member and the second housing member, at least a pair of projections provided on an inner surface of one of the first and second base plates of the first and second housing members, and a locking mechanism for locking the first and second housing members together when the tape cassette housing is closed. The first and second housing members are connected to each other through the hinge member in a manner to be relatively openable, to thereby define a space therebetween for receiving the tape cassette when the tape cassette housing is closed. The projections are arranged in a manner to positionally correspond to the pressing members of the tape cassette when the tape cassette housing is closed while receiving the tape cassette therein, to thereby stably hold the tape cassette in the tape cassette housing. The locking mechanism includes a female means arranged on one of the first and second housing members, a male means arranged on the other of the first and second housing members so as to be releasably engaged with the female means and a biasing means arranged on the male means for biasing the male means toward the female means.

Further, in accordance with the present invention, a tape cassette housing is provided which is adapted to receive therein a tape cassette which includes a cassette casing having an upper casing member and a lower casing member arranged opposite to each other, a pair of reels arranged in the cassette casing, and a pair of pressing members arranged in the cassette casing for pressing the reels against one of the casing members. The tape cassette comprises a first housing member including a first base plate, a second housing member including a second base plate, a hinge member arranged between the first housing member and the second housing member, at least a pair of projections provided on an inner surface of one of the first and second base plates of the first and second housing members, and a locking mechanism for locking the first and second housing members together when the tape cassette housing is closed. The first and second housing members are connected to each other through the hinge member in a manner to be relatively openable, to thereby define a space therebetween for receiving the tape cassette when the tape cassette housing is closed. The projections are arranged in a manner to positionally correspond to the pressing members of the tape cassette when the tape cassette housing is closed while receiving the tape cassette therein, to thereby stably hold the tape cassette in the tape cassette housing. The locking mechanism includes a female member arranged on one of the first and second housing members and provided with a fitted-on section, a male member pivotally arranged on the other of the first and second housing members and provided with a fitted-in section adapted to be releasably engaged with the fitted-on section of the female member and a spring arranged on the male member for biasing the male member toward the female member.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, wherein.

DETAILED DESCRIPTION OF THE PREFERRED EMBODIMENTS

Figure 1:
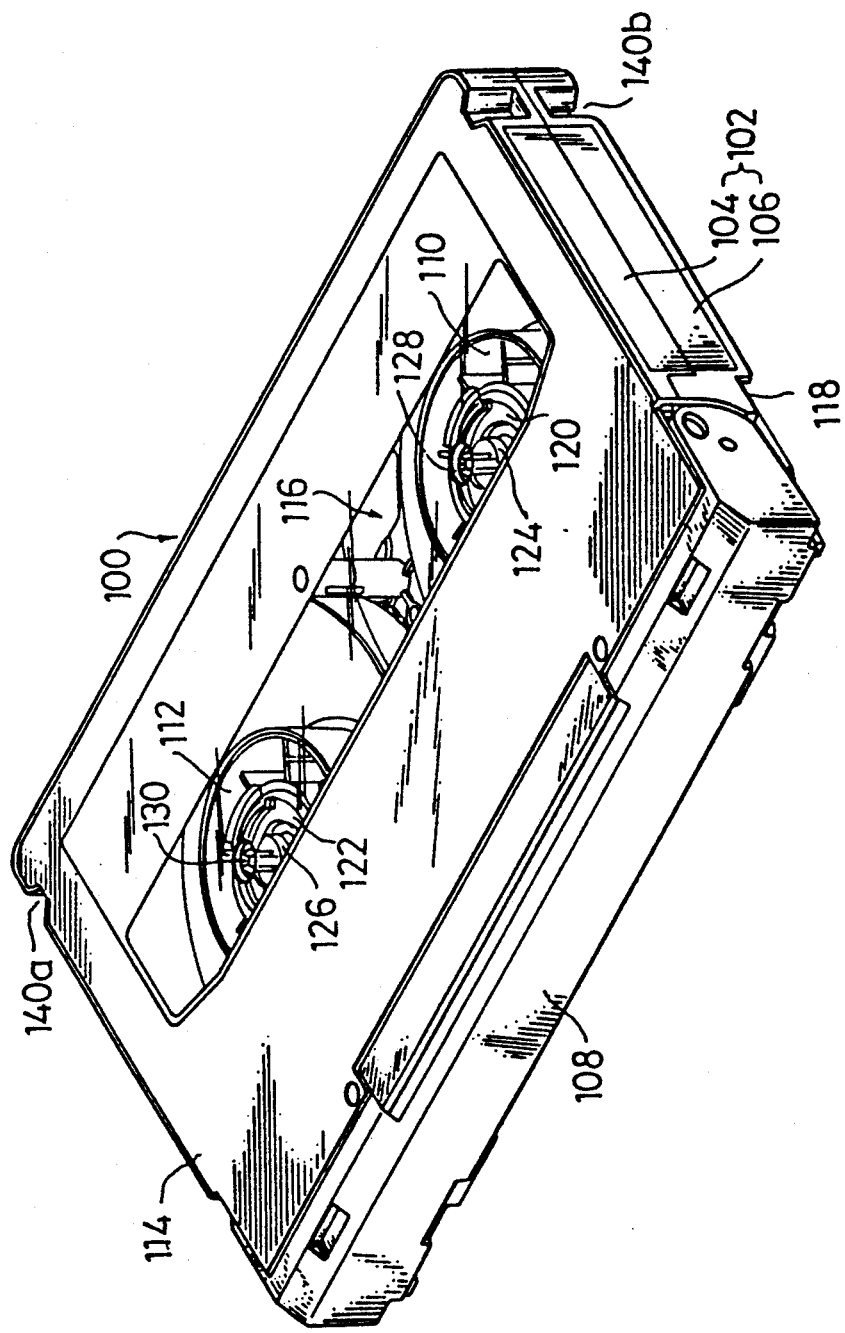
FIG. 1 is a perspective view generally showing an example of a video tape cassette which is constructed in such a manner that a part of the each of reel pressing members is arranged so as to, outwardly project from a cassette casing.

Now, a tape cassette housing according to the present invention will be described hereinafter with reference to FIGS. 4 to 15, wherein like reference numerals designate like or corresponding parts throughout.

Figure 2:
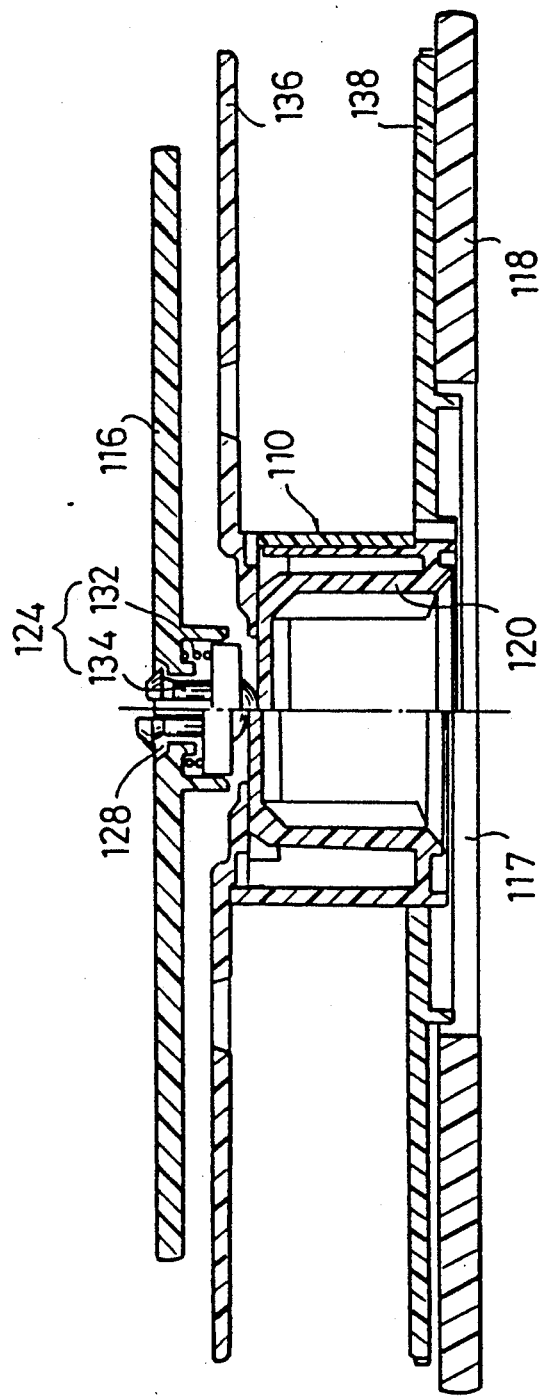
FIG. 2 is a fragmentary vertical sectional view showing a relationship between a reel and the reel pressing member in the video tape cassette shown in FIG. 1.
Figure 3:
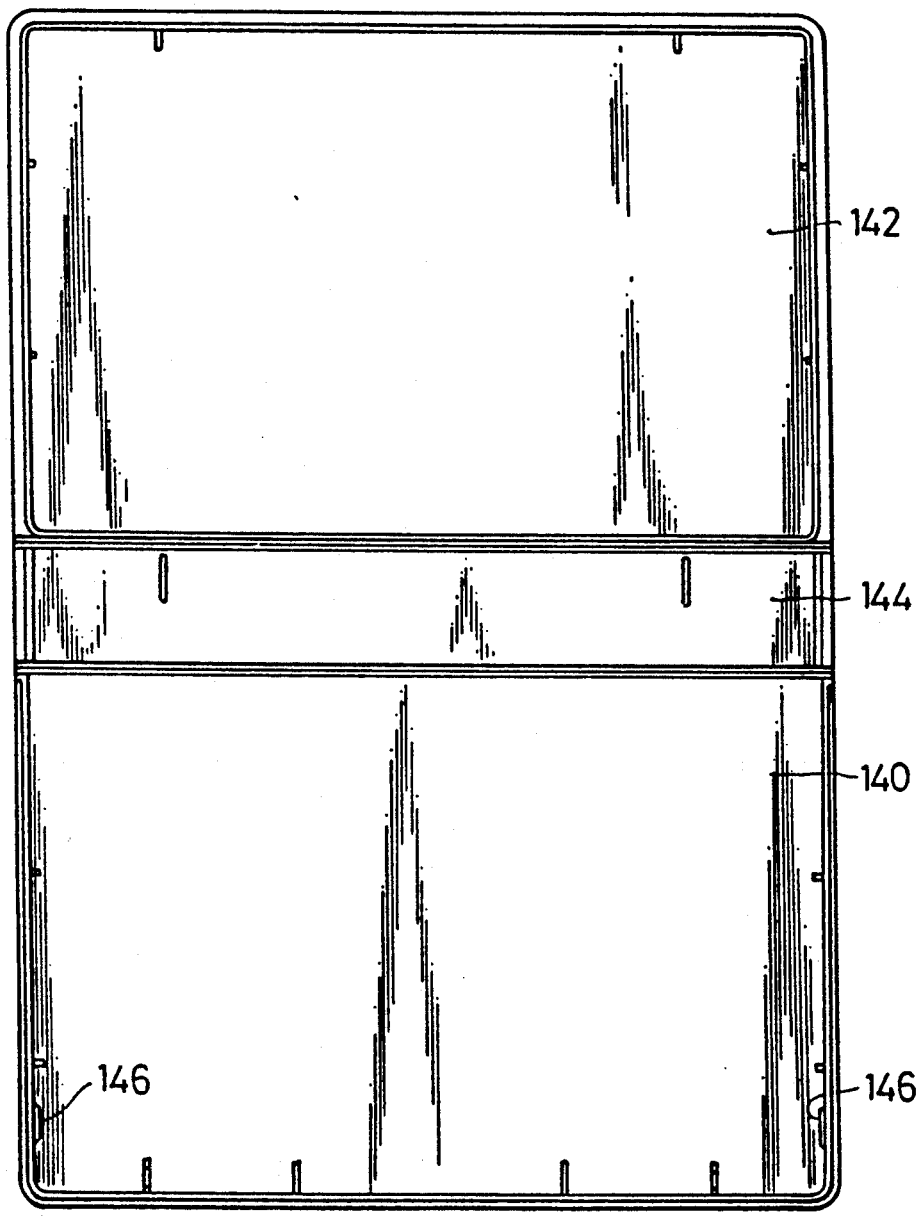
FIG. 3 is a development plan view showing an internal arrangement of a conventional tape cassette housing.
Figure 4:
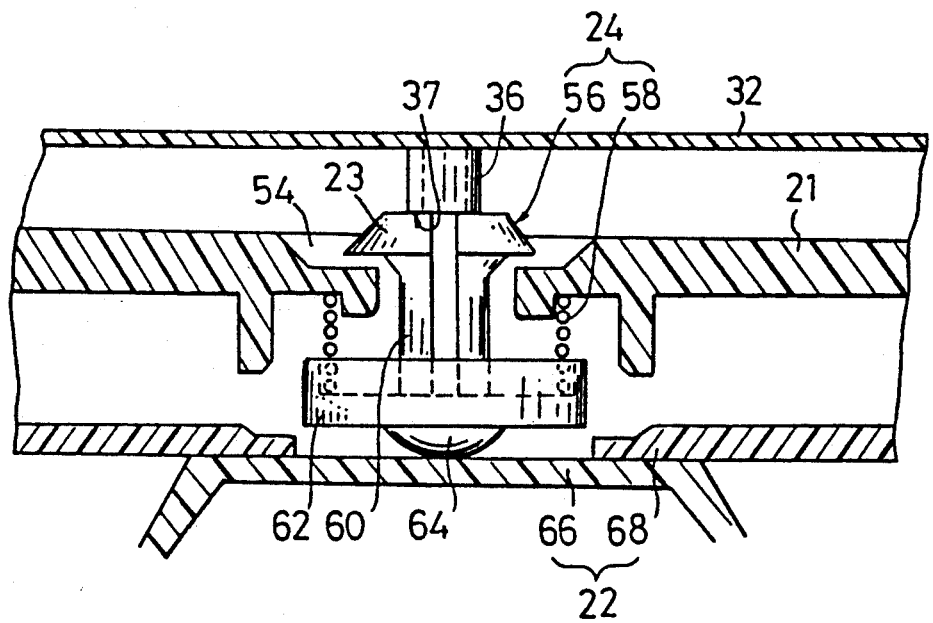
FIG. 4 is a fragmentary vertical sectional view showing an essential part of an embodiment of a tape cassette housing according to the present invention, in which a video tape cassette is received.
Figure 5:
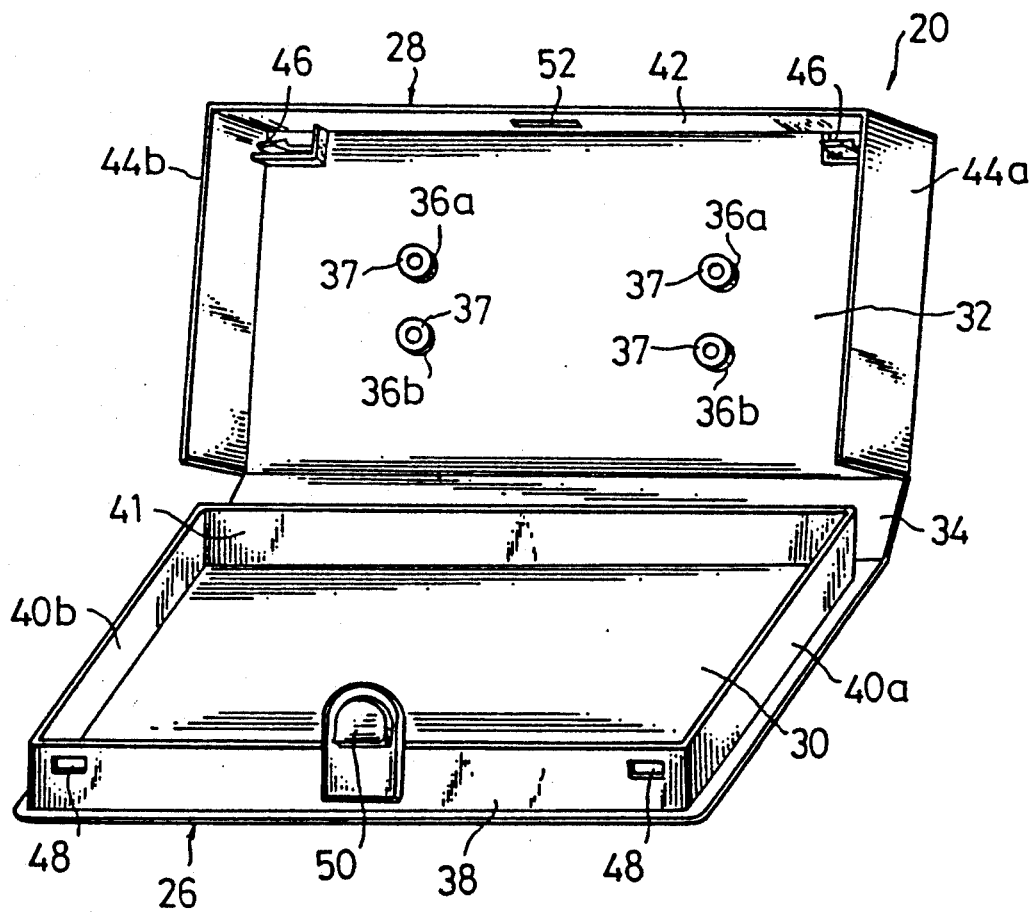
FIG. 5 is a perspective view showing an internal structure of the tape cassette housing shown in FIG. 4.

FIGS. 4 and 5 illustrate an embodiment of a tape cassette housing according to the present invention. A tape cassette housing of the illustrated embodiment generally designated at reference numeral 20 is adapted to receive therein a tape cassette which may be constructed as described above with reference to FIGS. 1 and 2. The tape cassette includes a cassette casing including an upper casing member 21 and a lower casing member (not shown) arranged opposite to each other, a pair of reels 22 arranged in the casing for winding a magnetic tape thereon, and a pair of pressing members 24 arranged in the casing for pressing the reels 22 against one of the upper and lower casing members. FIG. 4 shows only one of the reels 22 and therefore only one of the pressing members 24.

The tape cassette housing 20 generally includes a first housing member 26 or 28 including a first base wall 30 or 32. a second housing member 28 or 26 including a second base wall 32 or 30 and a hinge member 34. The first and second housing members 26 and 28 are openably connected to each other through the hinge member 34 in a manner to be openable relative to each other, to thereby form a box structure having a space defined therein for receiving the tape cassette. The tape cassette housing 20 also includes at least a pair of projections 36 provided on an inner surface of one of the first and second base plates of the first and second housing members. The projections 36 are arranged in a manner to positionally correspond to the pressing members 24 of the tape cassette when the tape cassette housing is closed while receiving the tape cassette therein, to thereby stably hold the tape cassette in the tape cassette housing.

More specifically, in the illustrated embodiment, the first housing member comprises a housing body 26 and the second housing member comprises a cover 28. Thus, in the illustrated embodiment, the first base plate comprises a rectangular bottom plate 30 and the second base plate comprises a rectangular top plate 32. The first housing member 26 includes in addition to the bottom plate 30, a front side plate 38, lateral side plates 40a and 40b, and a rear side plate 41 arranged on an outer periphery of an upper surface of the bottom plate 30 so as to surround the bottom plate 30 or vertically or upward extend from the bottom plate 30. The cover 28 includes in addition to the top plate 32, a front side plate 42 and both lateral side plates 44a and 44b arranged on an outer periphery of a lower surface of the top plate defined when the cover 28 is put on the housing body 26, so as to extend vertically or downward therefrom. Thus, it will be noted that the illustrated embodiment is so constructed that the cover 28 is fitted on the housing body 26 when the tape cassette housing 20 is closed. Also, in the illustrated embodiment, the side plates 42, 44a and 44b of the cover 28 each are formed into a configuration or dimensions sufficient to permit a distal end thereof to be abutted against the bottom plate 30 of the housing body 26. The hinge member 34 is arranged between a rear end of the housing body 26 and a rear end of the cover 28 so as to extend along the whole rear portion of the housing body 26 and cover 28, to thereby connect both to each other therethrough and exhibit a hinge action therebetween. The above-described construction of the illustrated embodiment results in the hinge member 34 acting as a rear wall or plate of the cover 28. In the illustrated embodiment, the housing body 26, cover 28 and hinge member 34 may be formed integral with one another.

The projections 36 each, in the illustrated embodiment, are arranged on the inner surface of the top plate 32 of the cover 28 in a manner to positionally correspond to an upper flange 23 of each of the pressing members 24 of the tape cassette. The projections 36 function to restrain the pressing members 24 to regulate movement of the reels 22 in an axial direction of the reels 22. More specifically, the projections each have an end surface 37 functioning as a regulating surface which is adapted to be abutted against the flange 23 of the reel 22 to regulate the reel 22 in an axial direction thereof.

In the illustrated embodiment, a pair of rear-side projections 36a and a pair of front-side projections 36b are arranged on the inner surface of the cover 28 in a manner to be spaced from each other at suitable intervals. The rear projections 36a each are provided for engaging with the pressing member when the tape cassette is received in the housing 20 in such a manner that a front lid of the tape cassette faces the front side of the tape cassette housing 20, whereas the front projections 36b are used when it is received in the housing 20 in such a manner that the front lid faces the rear side of the housing 20.

The top plate 32 of the cover 28 is provided on both sides of a front portion of the inner surface thereof with a pair of hooks 46 for provisional locking of the housing and correspondingly the front side plate 38 of the housing body 26 is formed with a pair of holes 48 with which the hooks 46 are fittedly engaged. Also, the front side plate 38 of the housing body 26 is provided at a central portion thereof with a locking member 50 in the form of a projection and correspondingly the front side plate 42 of the cover 28 is provided with a hole 52 in which the locking projection 46 is fitted.

Now, the manner of operation of the tape cassette housing of the illustrated embodiment constructed as described above will be described hereinafter with reference to FIGS. 4 and 5.

When the tape cassette is placed in the housing body 26 of the tape cassette housing 20 and then the cover 28 is put on the housing body 26 to engagedly fit the hooks 46 and locking member 50 in the holes 52 and 48, respectively, the tape cassette housing is locked. This causes the end surfaces 37 of the projections 36a or 36b provided on the inner surface of the top plate 32 of the cover 28 to downwardly force the upper flanges 23 of the pressing members 24, to outwardly project via through-holes 54 of the upper casing member of the tape cassette, to thereby press the reels 22 against a lower plate of the lower casing member. The pressing members 24 each include a button 56 and a coiled spring 58. The button 42 comprises a quartered pillar member 60 having the flange 23 provided at an upper end thereof, a dish-shaped base 62 for supporting the coiled spring 58 thereon and a downward projection 64 provided on a lower surface of the base 62, which are formed integral with one another. Thus, the reels 22 are securely held on the lower plate of the lower casing member, resulting in being prevented from chattering or clattering during the transportation.

In FIG. 4, reference numerals 66 and 68 each designate a hub and an upper flange of the hub 66, respectively.

Figure 6:
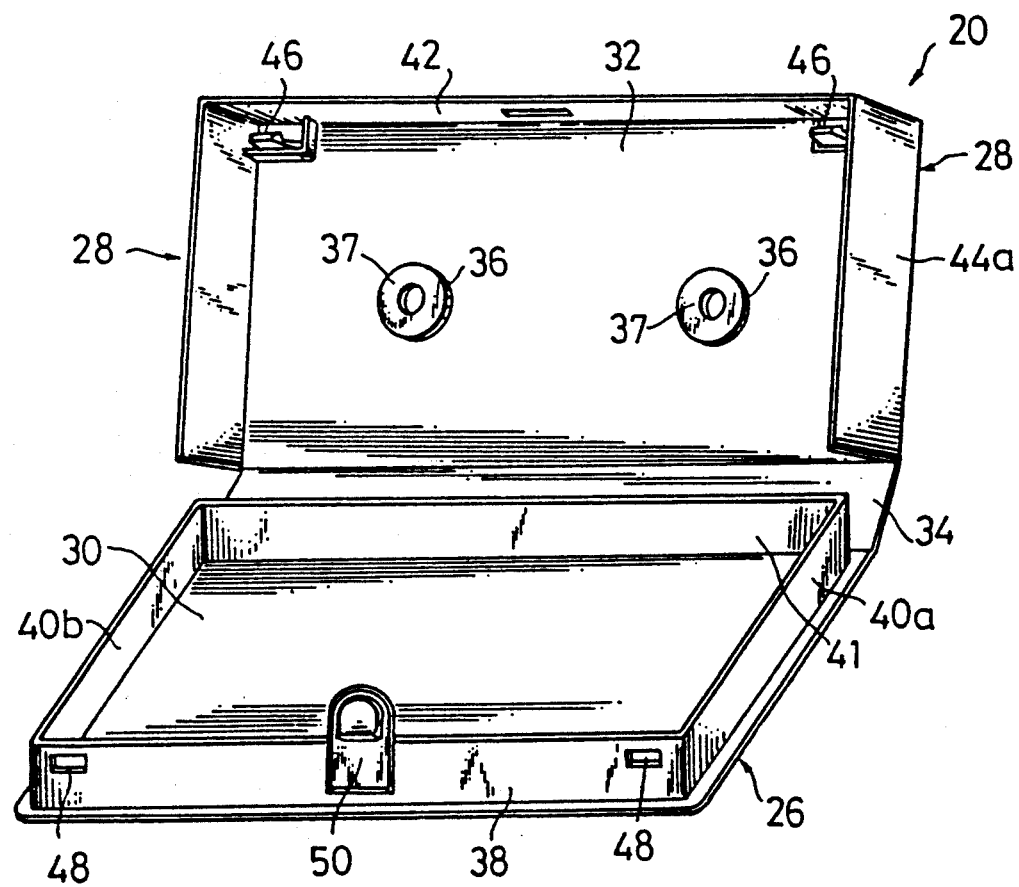
FIG. 6 is a perspective view showing an internal structure of a modification of the tape cassette housing shown in FIG. 4.

FIG. 6 shows a modification of the tape cassette housing shown in FIGS. 4 and 5. A tape cassette housing of the modification is so constructed that only a pair of projections 36 are provided on an inner surface of a top plate 32 of a cover 28 to force a pair of pressing members of a tape cassette. The remaining part of the modification may be constructed in substantially the same manner as the tape cassette housing shown in FIGS. 4 and 5. In the modification, the projections 36 are formed into an increased diameter and positioned at a central portion of the inner surface of the top plate 32 in a manner to be spaced from each other at a predetermined interval, resulting in being positively engaged with the pressing members of the tape cassette irrespective of a direction in which the tape cassette is received in the tape cassette housing 20. Such arrangement of the projections 36 permits the projections to positively press the pressing members of the tape cassette in both cases that the tape cassette is received in the tape cassette housing while the tape cassette is directed at a front portion thereof toward a front side plate 38 of the housing body 26 and the former is received in the latter while directing the front portion of the tape cassette toward a rear side plate 41 of the housing body 26.

Figure 7:
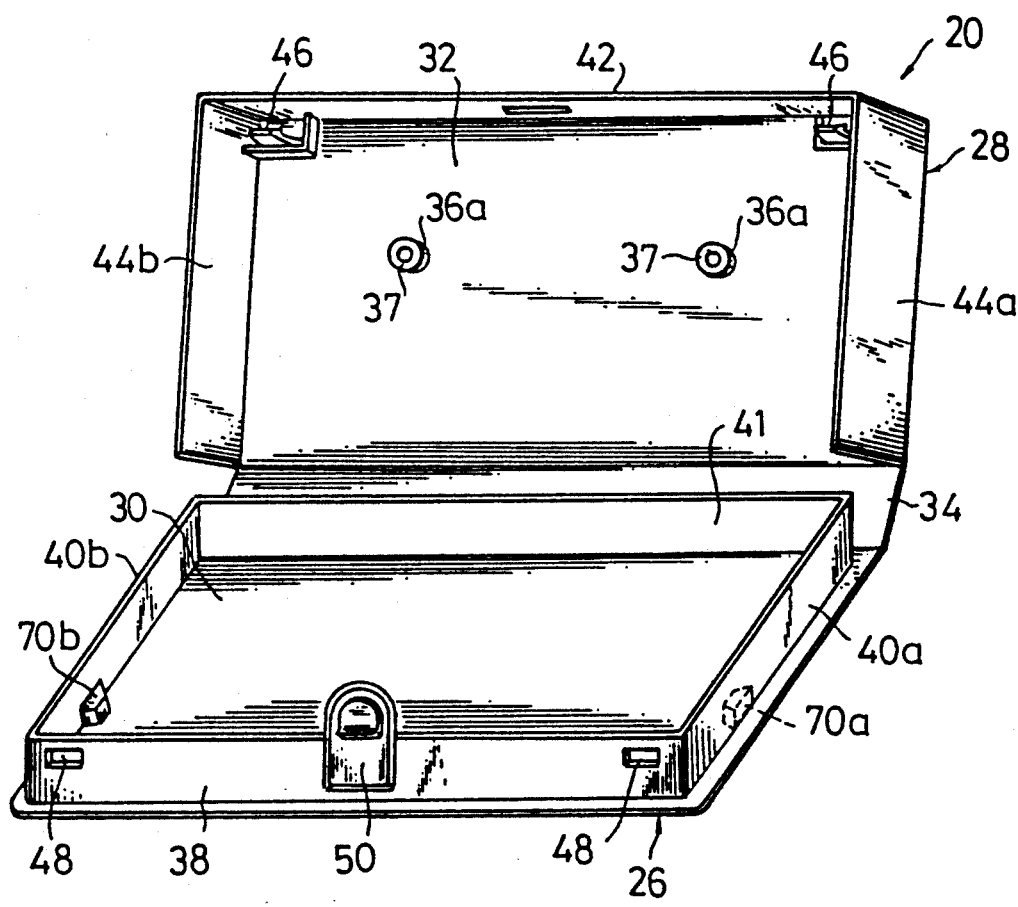
FIG. 7 is a perspective view showing an internal structure of another modification of the tape cassette housing shown in FIG. 4.
Figure 8:
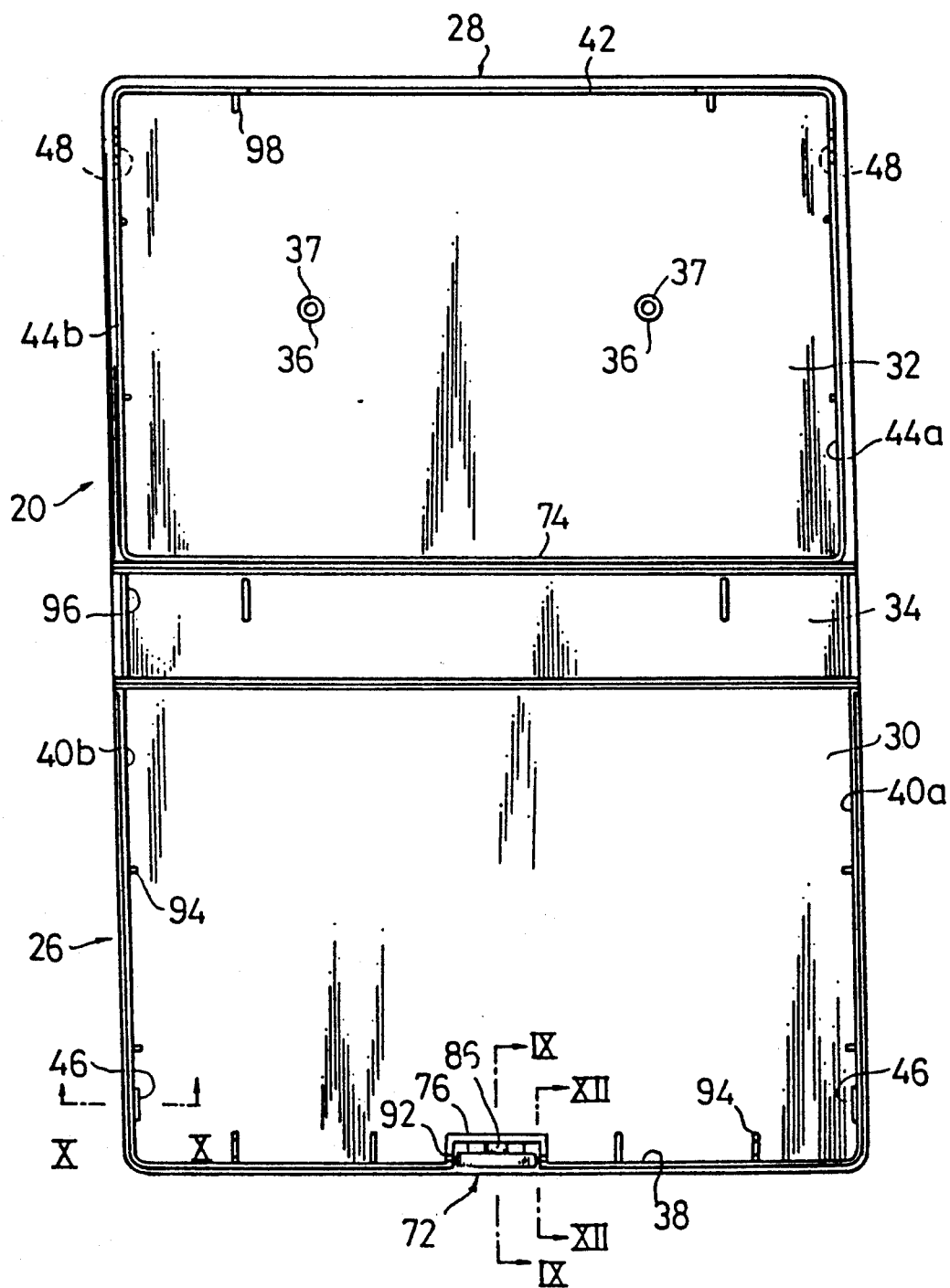
FIG. 8 is a development plan view showing an internal structure of another embodiment of a tape cassette housing according to the present invention.
Figure 9:
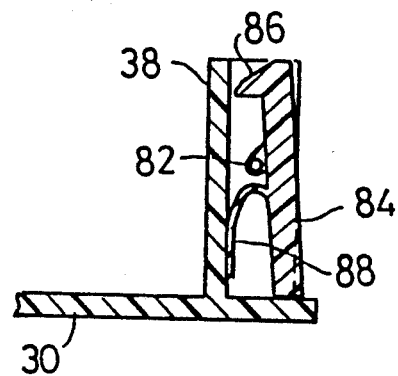
FIG. 9 is an enlarged sectional view taken along line IX—IX of FIG. 8 in which a cover is kept open.
Figure 10:
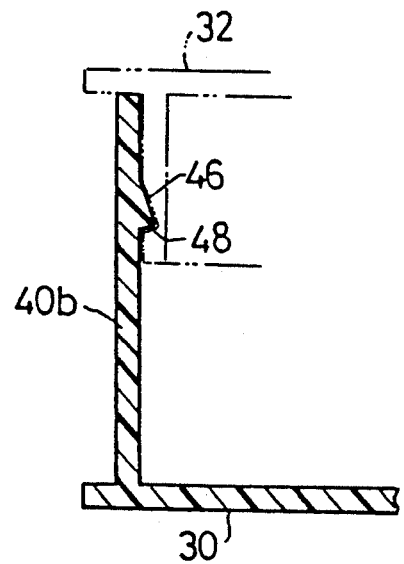
FIG. 10 is an enlarged sectional view taken along line X—X of FIG. 8.
Figure 11:
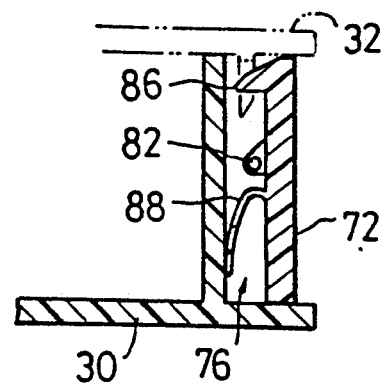
FIG. 11 is an enlarged sectional view similar to FIG. 9 in which a cover is kept closed.
Figure 12:
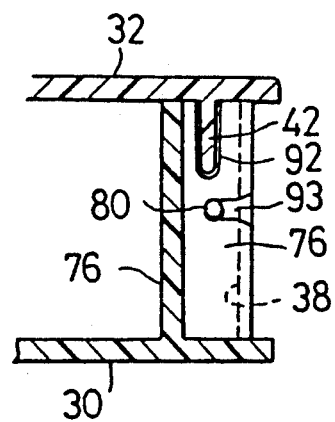
FIG. 12 is an enlarged sectional view taken along line XII—XII of FIG. 8 in which a cover is kept closed.
Figure 13:
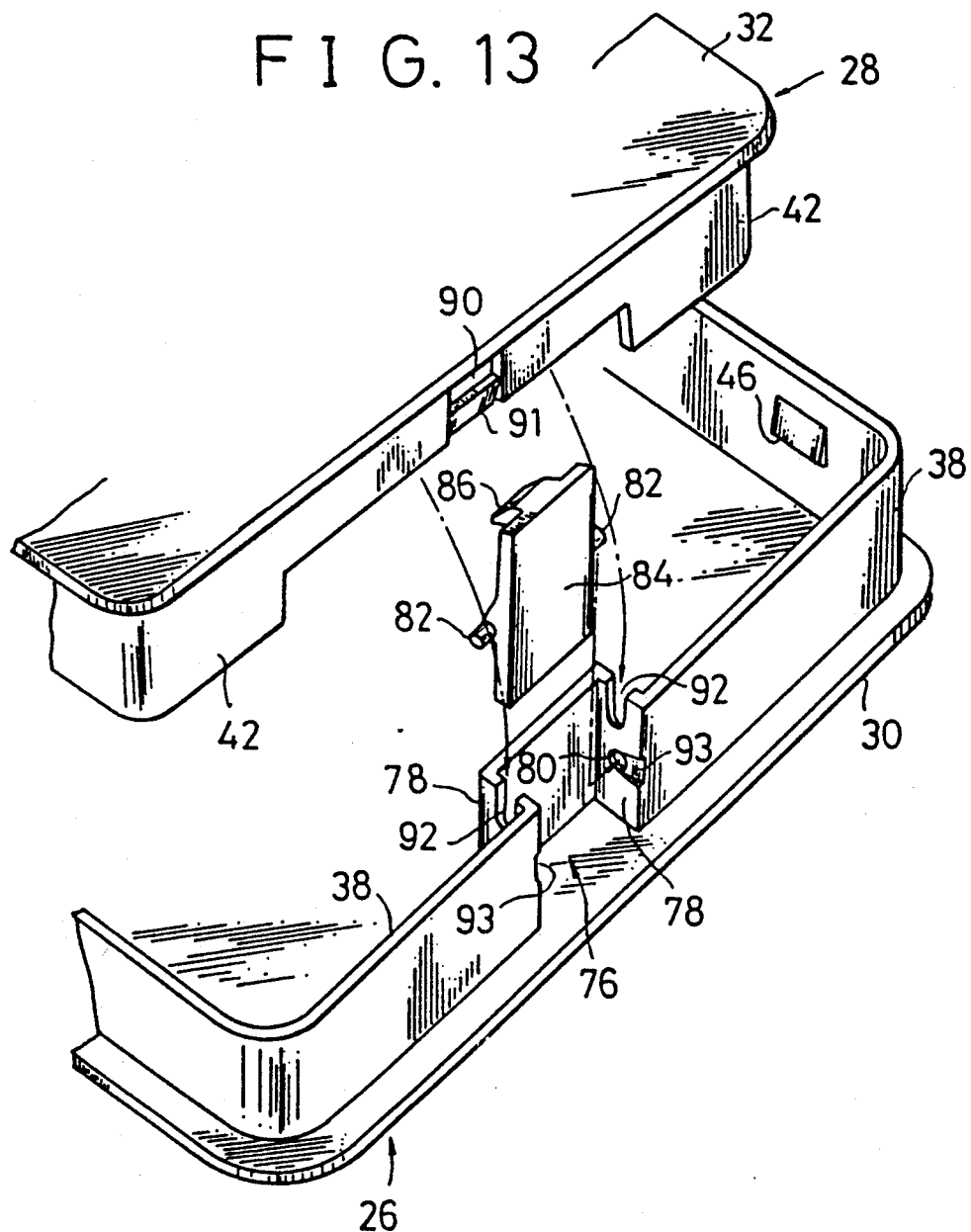
FIG. 13 is a fragmentary exploded perspective view showing an essential part of the tape cassette casing shown in FIG. 8.

FIG. 7 shows another modification of the tape cassette housing shown in FIGS. 4 and 5. A tape cassette housing of the modification is so constructed that only a pair of front-side projections 36a are arranged on an inner surface of a top plate 32 of a cover 28 so as to positionally correspond to pressing members of a tape cassette when the tape cassette is received in the tape cassette 20 while directing a front portion of the tape cassette toward a rear side of the tape cassette housing 20. Also, the tape cassette housing of the modification is provided with a means for determining or confirming a direction of the tape cassette to be received in the tape cassette housing. More particularly, in the tape cassette housing 20 of the modification, lateral side walls 40a and 40b of a housing each are provided on a front portion of an inner surface thereof with protrusions 70a and 70b in a manner to inward project from a lower half of the front portion. The protrusions 70a and 70b are arranged so as to positionally correspond to recesses formed on rear portions of side surfaces of a cassette casing, as indicated at reference numerals 140a and 140b in FIG. 1. The recesses 140a and 140b are provided for the purpose of engagedly holding pawls of a tape cassette deck when the tape cassette is charged in the deck. Such construction requires a front side of the tape cassette toward a rear side of the tape cassette housing and fit the recesses of the tape cassette on the protrusions 70a and 70b of the tape cassette housing 20 when the tape cassette is received in the housing 20, so that the tape cassette may be necessarily received in the cassette tape housing 20 in a correct posture. In the modification, lateral side plates 44a and 44b of a cover 42 may be provided on a front portion of an inner surface thereof with like protrusions (not shown) in a manner to inwardly project from an upper half of the front portion.

In the embodiment described above, the projections 36 are arranged on the cover. However, it is a matter of course that the projections may be arranged on an inner surface of the bottom plate of the housing body in substantially the same manner as described above.

As can be seen from the foregoing, the cassette tape housing of the illustrated embodiment is so constructed that the projections 36 provided on the cover of the housing downwardly press downwardly pressing members of the tape cassette to securely hold the reels of the tape cassette in the cassette casing of the tape cassette. Such construction effectively prevents chattering or clattering of the reels in the cassette casing during transportation of the tape cassette to eliminate production of fragments or dust in the casing, to thereby prevent any error from being produced in signals stored on the magnetic tape due to the fragments or dust and a head of a tape cassette deck from being clogged with the fragments or dust.

Referring now to FIGS. 8 to 13 showing another embodiment of a tape cassette housing according to the present invention, a tape cassette housing of the illustrated embodiment is constructed so as to exhibit a function of positively locking the housing itself as well as the function of the above-described embodiment. For this purpose, the tape cassette housing generally includes a first housing member 26 or 28 including a first base plate 30 or 32, a second housing member 28 or 26 including a second base plate 32 or 30, a hinge member 34 connected between the first housing member and the second housing member, and at least a pair of projections 36 provided on an inner surface of one of the first and second base plates of the first and second housing members. The first and second housing members are connected to each other through the hinge member in a manner to be openable relatively to each other, to thereby form a box structure having a space defined therein for receiving the tape cassette. The projections 36 are arranged in a manner to positionally correspond to the pressing members of the tape cassette when the tape cassette housing is closed while receiving the tape cassette therein, to thereby stably hold the tape cassette in the tape cassette housing.

The tape cassette housing of the illustrated embodiment further includes a locking mechanism for locking the first and second housing members together when the first and second housing members are in a position which permits the tape cassette housing to be closed. The locking mechanism is generally designated at reference numeral 72.

The remaining part of the embodiment may be constructed in substantially the same manner as the embodiment described above with reference to FIGS. 4 to 7.

More specifically, in the illustrated embodiment, the first housing member comprises a housing body 26 and the second housing member comprises a cover 28. Thus, in the illustrated embodiment, the first base plate comprises a rectangular bottom plate 30 and the second base plate comprises a rectangular top plate 32. The first housing member 26 includes in addition to the bottom plate 30, a front side plate 38 and both lateral side plates 40a and 40b arranged on an outer periphery of an upper surface of the bottom, plate 30 so as to surround the bottom plate 30 or vertically or upwardly extend from the bottom plate 30. The cover 28 includes in addition to the top plate 32, a front side plate 42, both lateral side plates 44a and 44b, and a rear side plate 74 arranged on an outer periphery of a lower surface of the top plate defined when the cover 28 is put on the housing body, so as to vertically or downwardly extend therefrom. Thus, it will be noted that the illustrated embodiment is so constructed that the side plates of the cover 28 are fitted in the side plates of the housing body 26 when the tape cassette housing 20 is closed. Also, in the illustrated embodiment, the side plates 38, 40a and 40b of the housing body 26 each are formed into a configuration or dimensions sufficient to permit a distal end thereof to be abutted against the top plate 32 of the cover 28. The hinge member 34 is arranged between a rear end of the housing body 26 and a rear end of the cover 28 so as to extend along the whole rear portion of the housing body 26 and cover 28, to thereby connect both to each other therethrough and exhibit a hinge action therebetween. The above-described construction of the illustrated embodiment results in the hinge member 34 acting as a rear wall or plate of the housing body 26. In the illustrated embodiment, the housing body 26, cover 28 and hinge member 34 may be formed integral with one another.

The projections 36 each are arranged on the inner surface of the top plate 32 of the cover 28, as in the above-described embodiment. In the illustrated embodiment, the projections 36 are arranged in a pair.

The lateral side plates 44a and 44b of the cover 28 are provided at portions thereof opposite to each other with a pair of recesses or apertures 48 and correspondingly the lateral side plate 40a and 40b of the housing body 26 are formed with a pair of projections or hooks 46, so that the projections 46 and recesses 48 are engaged with each other to permit the housing body 26 and cover 28 to be provisionally locked together when the tape cassette housing is closed.

The locking mechanism 72 is arranged at the housing body 26 or cover 28 and comprises a female means provided on one of the first and second housing members, a male means provided on the other of the first and second housing members so as to be engaged with the female means, and a biasing means provided on the male means to bias the male means toward the female means.

More specifically, in the illustrated embodiment, the front side plate 38 of the housing body 26 is provided with a recess or depression 76 formed of both side walls 78 opposite to each other and a bottom wall defined between both side walls 78. Alternatively, the depression 76 may be provided at one of the lateral side plates 40a and 40b. The opposite side surfaces 78 of the depression 76 are provided with a pair of bearings 80 in a manner to be opposite to each other, in which a pivot shaft 82 is rotatably supported at both ends thereof. On the pivot shaft 82 is mounted a locking member 84 formed into a plate-like shape so as to pivotally moved about the pivot shaft 82 with rotation of the shaft 82. The locking member 84 is provided with a pawl or hook 86 and a spring member 88. The front side plate 42 of the cover 28 is provided with a holding element 90 in a manner to correspond to the hook 86 of the locking member mounted on the housing body 26.

In the illustrated embodiment, the locking member 84 is formed into a plate-like shape as described above, and the hook 86 is arranged at one end of a rear surface of the locking member 84 and the spring member 88 is positioned at the other end of the rear surface of the member 84. The hook 86 and spring 88 are formed integral with the locking member 84. The pivot shaft 82 is so arranged that both ends thereof project from both sides of a central portion of the locking member 84. The locking member 84 may be preferably arranged in such a manner that a front surface thereof is flush with the front side plate 38 of the housing body 26 when the housing body 26 and cover 28 are locked together through the locking member 84. Such arrangement of the locking member 84 facilitates handling of the tape cassette casing and improves quality of the housing.

The locking member 84 is preferably made of a material which exhibits satisfactory lubricating properties and elasticity to a degree sufficient to prevent settling and shaving of the locking member and reduce frictional resistance of the member, to thereby ensure smooth operation of the locking member. For this purpose, the locking member 84 may be formed of POM resin and the housing body 26 may be made of PP resin.

The side walls 78 of the depression or recess 76 each are formed with a U-shaped cutout 92 in which a part of the front side plate 42 of the cover 28 is fitted. Such construction not only prevents dust from entering the tape cassette housing closed but prevents deformation of the housing as molded. Further, it effectively prevents misregistration between the cover 28 and the housing body 26. Arrangement of the depression 76 of a U-shape prevents the front side plate 38 of the housing body 26 from falling during forming or molding of the housing body. The depression 76 also functions to prevent the front side plate from falling when the locking member 84 is pressed for the purpose of accomplishing locking between the cover 28 and the housing body 26, because the bottom wall of the depression abuts against the tape cassette received in the tape cassette housing.

The holding element 90 comprises a hole such as an aperture, a recess or the like formed at the front side plate 42 of the cover 28 so as to engageably fit the hook 86 of the locking member 84 therein. The holding element 90 is formed with a guide 91 for the hook 86, which guide may comprise a slant or tapered surface formed on the holding element, so that the housing body 26 and cover 28 are automatically locked together through engagement between the locking member 84 and holding element 90 when the tape cassette housing 20 is closed.

Thus, it will be noted that in the illustrated embodiment the hook 86 constitutes the male means or fitted-in member and the hole 90 constituents the female means or fitted-in element in which the hook 86 is fitted.

In the illustrated embodiment, the pawl or hook 86 is arranged at the locking member 84 and the hole 90 such as an aperture, a recess or the like is formed at the front side plate 42 of the cover 28. However, the hook 86 and hole 90 may be provided at the cover 28 and the locking member 84, respectively. Also, the bearings 80 and pivot shaft 82 may be arranged at the locking member 84 and depression 76, respectively. At least one of the side walls 78 of the depression 76 may be formed with a tapered recess 93 for smoothly guiding the pivot shaft 82 when the locking member 84 is to be fitted in the depression 76.

In FIGS. 8 to 13, reference numerals 94, 96 and 98 designrate ribs provided on the inner surface of the housing body 26 so as to function also as a means for regulating a position of the tape cassette, partitions provided for ensuring sealing and engagement between the lateral side plates 40 and 44 of the housing body 26 and cover 28, and ribs provided on the inner surface of the cover 28.

Figure 14:
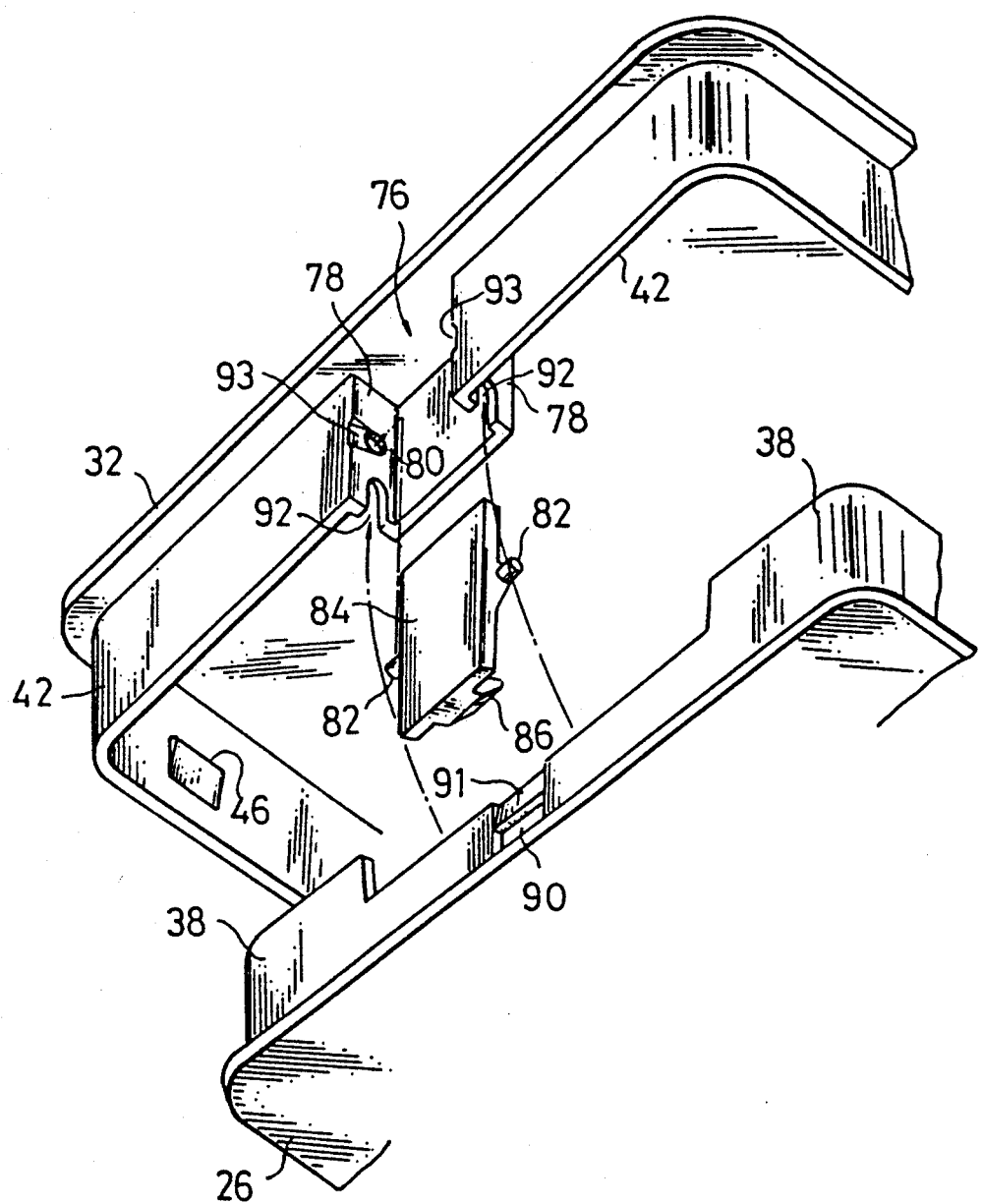
FIG. 14 is a fragmentary exploded perspective view showing an essential part of a modification of the tape cassette casing shown in FIG. 8.

In the embodiment, the male means and female means of the locking mechanism are arranged relative to each other. Therefore, although the hook 86 and hole 90 are respectively provided at the housing body 26 and cover 28 in the illustrated embodiment, they may be arranged conversely. In the illustrated embodiment, the male means includes the locking member 84 and the female means includes the holding element 90. FIGS. 14 shows a modification of the illustrated embodiment, wherein a hook 86 and a hole or recess 90 are provided at a cover 28 and a housing body 26, respectively. The remaining part of the modification may be constructed in substantially the same manner as the embodiment of FIGS. 8 to 13.

Figure 15:
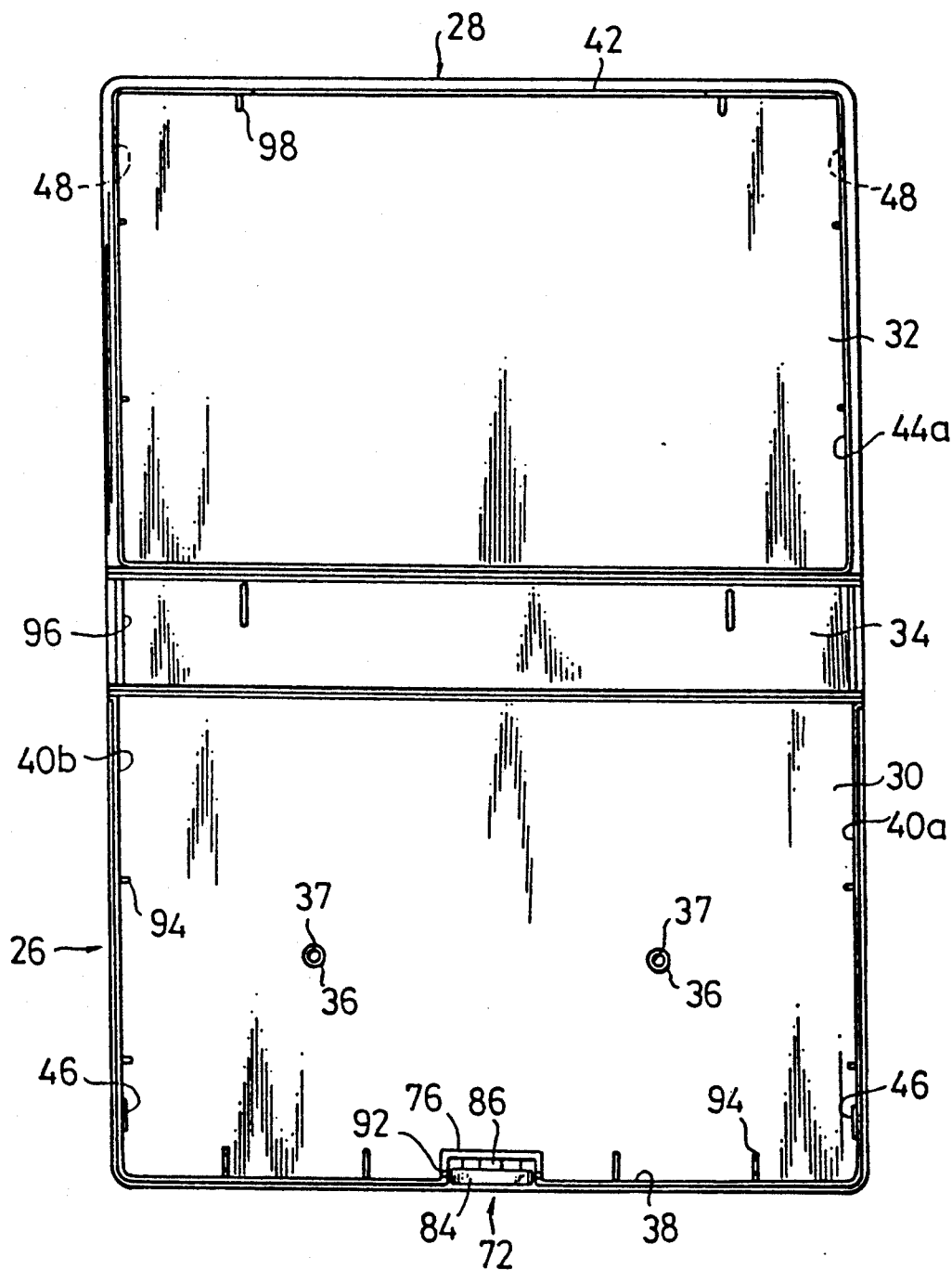
FIG. 15 is a development plan view showing an internal structure of another modification of the tape cassette housing shown in FIG. 8.

Also, the projections 36 may be provided on the inner surface of the bottom plate 30 of the housing body 26, as shown in FIG. 15 showing another modification of the embodiment shown in FIGS. 8 to 13.

As can be seen from the foregoing, the embodiment shown in FIGS. 8 to 15 is so constructed that the side plate of the housing body is formed with the depression 76 of which the side walls 78 each are provided with the bearing 80 and the locking member 84 is pivotally supported through the pivot shaft 82 and bearings 80 on the depression 76. Also, the locking member 84 is provided with the hook 86 and spring 88 and correspondingly the cover 28 is provided with the holding element or hole 90, so that both may be releasably or detachably engaged with each other. Such construction of the embodiment permits the cover and housing body to be securely and releasably locked together when the tape cassette housing is closed and significantly improves impact or shock resistance, resulting in providing the tape cassette housing with substantially increased safety. Also, it permits the tape cassette housing to be readily handled in a simple manner while ensuring, a satisfactory locking action and provides the housing with good durability and dust-proofness.

While preferred embodiment of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A tape cassette housing for receiving therein a tape cassette which includes a cassette casing having an upper casing member and a lower casing member arranged opposite to each other, a pair of reels arranged in the cassette casing, a pair of pressing members arranged in the cassette casing for pressing the reels against one of the casing members, comprising:

a first housing member including a first base plate;

a second housing member including a second base plate;

a hinge member arranged between, said first housing member and said second housing member;

said first and second housing members being connected to each other through said hinge member in a manner to be relatively openable, to thereby define a space therebetween for receiving the tape cassette when the tape cassette housing is closed; and at least a pair of projections provided on an inner surface of one of said first and second base plates of said first and second housing members;

said projections being arranged in a manner to positionally correspond to said pressing members of the tape cassette when the tape cassette housing is closed while receiving the tape cassette therein, to thereby stably hold the tape cassette in the tape cassette housing.

2. A tape cassette housing as defined in claim 1, wherein said first housing member comprises a housing body and said first base plate comprises a bottom plate; and said second housing member comprises a cover and said second base plate comprises a top plate.

3. A tape cassette as defined in claim 2, wherein said projections are arranged on an inner surface of said top plate of said cover.

4. A tape cassette as defined in claim 1, wherein a pair of said projections are arranged.

5. A tape cassette as defined in claim 1, wherein two pairs of said projections are arranged.

6. A tape cassette housing as defined in claim 1, wherein said projections each are abutted at an end surface thereof against said pressing member to requlate movement of said reel in an axial direction thereof.

7. A tape cassette as defined in claim 4, further comprising a means for determining a direction of the tape cassette to be received in the tape cassette housing.

8. A tape cassette housing for receiving therein a tape cassette which includes a cassette casing having an upper casing member and a lower casing member arranged opposite to each other, a pair of reels arranged in the cassette casing, a pair of pressing members arranged in the cassette casing for pressing the reels against one of the casing members, comprising:

a first housing member including a first base plate:

a second housing member including a second base plate;

a hinge member arranged between said first housing member and said second housing member;

said first and second housing members being connected to each other through said hinge member in a manner to be relatively openable, to thereby define a space therebetween for receiving the tape cassette when the tape cassette housing is closed;

at least a pair of projections provided on an inner surface of one of said first and second base plates of said first and second housing members;

said projections being arranged in a manner to positionally correspond to said pressing members of the tape cassette when the tape cassette housing is closed while receiving the tape cassette therein, to thereby stably hold the tape cassette in the tape cassette housing;

a locking mechanism for locking said first and second housing members together when the tape cassette housing is closed;

said locking mechanism including a female means arranged on one of said first and second housing members, a male means arranged on the other of said first and second housing members so as to be releasably engaged with said female means and a biasing means arranged on said male means for biasing said male means toward said female means.

9. A tape cassette housing as defined in claim 8, wherein said first housing member comprises a housing body and said first base plate comprises a bottom plate; and said second housing member comprises a cover and said second base plate comprises a top plate.

10. A tape cassette housing as defined in claim 9, wherein said male means of said locking mechanism is arranged at a side plate of said housing body and said female means is arranged at a side plate of said cover.

11. A tape cassette housing as defined in claim 8, wherein said first housing member comprises a cover and said first base plate comprises a top plate; and said second housing member comprises a housing body and said second base plate comprises a bottom plate.

12. A tape cassette housing as defined in claim 11, wherein said male means of said locking mechanism is arranged at a side plate of said cover and said female means is arranged at a side plate of said housing body.

13. A tape cassette housing as defined in claim 10, wherein said male means comprises a fitted-in member and said female means comprises a fitted-on element in which said fitted-in member is releasably fitted.

14. A tape cassette housing as defined in claim 13, wherein said fitted-in member comprises a hook and said fitted-on element is a hole.

15. A tape cassette housing as defined in claim 10, wherein said male means comprises a locking member provided with a hook and said female means comprises a holding element provided with a hole in which said hook of said locking member is releasably fitted.

16. A tape cassette housing as defined in claim 15, wherein said locking member is arranged so as to be pivotally moved.

17. A tape cassette housing as defined in claim 16, wherein said locking mechanism is arranged at a front portion of said housing body and cover.

18. A tape cassette housing as defined in claim 15, wherein said locking member is so arranged that an outer surface thereof is flush with an outer surface of said side wall.

19. A tape cassette housing as defined in claim 15, wherein said locking member is made of a material different from that of each of said housing body and cover.

20. A tape cassette housing as defined in claim 19, wherein said locking member is made of a material which exhibits lubricating properties and elasticity.

21. A tape cassette housing for receiving therein a tape cassette which includes a cassette casing having an upper casing member and a lower casing member arranged opposite to each other, a pair of reels arranged in the cassette casing, a pair of pressing members arranged in the cassette casing for pressing the reels against one of the casing members, comprising:

a first housing member including a first base plate;

a second housing member including a second base plate;

a hinge member arranged between said first housing member and said second housing member;

said first and second housing members being connected to each other through said hinge member in a manner to be relatively openable, to thereby define a space therebetween for receiving the tape cassette when the tape cassette housing is closed;

at least a pair of projections provided on an inner surface of one of said first and second base plates of said first and second housing members;

said projections being arranged in a manner to positionally correspond to said pressing members of the tape cassette when the tape cassette housing is closed while receiving the tape cassette therein, to thereby stably hold the tape cassette in the tape cassette housing;

a locking mechanism for locking said first and second housing members together when the tape cassette housing is closed;

said locking mechanism including a female member arranged on one of said first and second housing members and provided with a fitted-on section, a male member pivotally arranged on the other of said first and second housing members and provided with a fitted-in section adapted to be releasably engaged with said fitted-on section of said female member and a spring arranged on said male member for biasing said male member toward said female member.

* * * * *